United States Patent
Gadawski et al.

(10) Patent No.: US 9,105,950 B2
(45) Date of Patent: Aug. 11, 2015

(54) BATTERY SYSTEM HAVING AN EVAPORATIVE COOLING MEMBER WITH A PLATE PORTION AND A METHOD FOR COOLING THE BATTERY SYSTEM

(75) Inventors: Thomas J. Gadawski, Shelby Township, MI (US); Satish Ketkar, Troy, MI (US); Michael Nielson, Royal Oak, MI (US)

(73) Assignee: LG Chem, Ltd., Seoul (KR)

( * ) Notice: Subject to any disclaimer, the term of this patent is extended or adjusted under 35 U.S.C. 154(b) by 423 days.

(21) Appl. No.: 13/433,649

(22) Filed: Mar. 29, 2012

(65) Prior Publication Data

US 2013/0255293 A1    Oct. 3, 2013

(51) Int. Cl.
| | |
|---|---|
| *F25D 23/12* | (2006.01) |
| *H01M 10/613* | (2014.01) |
| *H01M 10/6569* | (2014.01) |
| *H01M 10/6551* | (2014.01) |
| *H01M 10/6555* | (2014.01) |

(52) U.S. Cl.
CPC ........ *H01M 10/613* (2015.04); *H01M 10/6551* (2015.04); *H01M 10/6555* (2015.04); *H01M 10/6569* (2015.04)

(58) Field of Classification Search
CPC . B60L 11/18; B60L 11/1805; B60L 11/1851; F25B 31/006; B60H 1/32; B60H 1/3204
USPC .................. 62/259.2, 516, 517, 524, 523, 244
See application file for complete search history.

(56) References Cited

U.S. PATENT DOCUMENTS

| | | |
|---|---|---|
| 1,587,425 A | 6/1926 | Schepp |
| 2,273,244 A | 2/1942 | Ambruster |
| 2,391,859 A | 1/1946 | Babcock |
| 3,503,558 A | 3/1970 | Galiulo et al. |

(Continued)

FOREIGN PATENT DOCUMENTS

| | | |
|---|---|---|
| DE | 19639115 A | 3/1998 |
| DE | 102008034860 A1 | 1/2010 |

(Continued)

OTHER PUBLICATIONS

Written Opinion for International application No. PCT/KR2013/002597 dated Jun. 25, 2013.

(Continued)

*Primary Examiner* — Cheryl J Tyler
*Assistant Examiner* — David Teitelbaum
(74) *Attorney, Agent, or Firm* — Buckert Patent & Trademark Law Firm, PC; John F. Buckert

(57) ABSTRACT

A battery system and a method for cooling the battery system are provided. The system includes an evaporative cooling member, and a battery module having a housing, a battery cell, and a solid cooling fin. The housing holds the battery cell therein. The solid cooling fin has first and second panel portions. The first panel portion is disposed against the battery cell. The second panel portion extends through the housing and is disposed on the evaporative cooling member. The solid cooling fin conducts heat energy from the battery cell to the evaporative cooling member. The evaporative cooling member receives a gaseous-liquid refrigerant and transitions the gaseous-liquid refrigerant into a gaseous refrigerant utilizing the heat energy received from the solid cooling fin.

18 Claims, 15 Drawing Sheets

(56) References Cited

U.S. PATENT DOCUMENTS

| | | | |
|---|---|---|---|
| 3,522,100 A | 7/1970 | Lindstrom | |
| 3,550,681 A | 12/1970 | Stier et al. | |
| 3,964,930 A | 6/1976 | Resier | |
| 4,009,752 A | 3/1977 | Wilson | |
| 4,063,590 A | 12/1977 | McConnell | |
| 4,298,904 A | 11/1981 | Koenig | |
| 4,305,456 A | 12/1981 | Mueller et al. | |
| 4,322,776 A | 3/1982 | Job et al. | |
| 4,444,994 A | 4/1984 | Baker et al. | |
| 4,518,663 A | 5/1985 | Kodali et al. | |
| 4,646,202 A | 2/1987 | Hook et al. | |
| 4,701,829 A | 10/1987 | Bricaud et al. | |
| 4,777,561 A | 10/1988 | Murphy et al. | |
| 4,849,858 A | 7/1989 | Grapes et al. | |
| 4,982,785 A | 1/1991 | Tomlinson | |
| 4,995,240 A | 2/1991 | Barthel et al. | |
| 5,057,968 A | 10/1991 | Morrison | |
| 5,071,652 A | 12/1991 | Jones et al. | |
| 5,186,250 A | 2/1993 | Ouchi et al. | |
| 5,214,564 A | 5/1993 | Metzler et al. | |
| 5,270,131 A | 12/1993 | Diethelm et al. | |
| 5,322,745 A | 6/1994 | Yanagihara et al. | |
| 5,329,988 A | 7/1994 | Juger | |
| 5,346,786 A | 9/1994 | Hodgetts | |
| 5,356,735 A | 10/1994 | Meadows et al. | |
| 5,392,873 A * | 2/1995 | Masuyama et al. | 180/68.5 |
| 5,443,926 A | 8/1995 | Holland et al. | |
| 5,510,203 A | 4/1996 | Hamada et al. | |
| 5,520,976 A | 5/1996 | Giannetti et al. | |
| 5,663,007 A | 9/1997 | Ikoma et al. | |
| 5,736,836 A | 4/1998 | Hasegawa et al. | |
| 5,756,227 A | 5/1998 | Suzuki et al. | |
| 5,937,664 A | 8/1999 | Matsuno et al. | |
| 5,985,483 A | 11/1999 | Verhoog et al. | |
| 6,087,036 A | 7/2000 | Rouillard et al. | |
| 6,111,387 A | 8/2000 | Kouzu et al. | |
| 6,159,630 A | 12/2000 | Wyser | |
| 6,176,095 B1 | 1/2001 | Porter | |
| 6,344,728 B1 | 2/2002 | Kouzu et al. | |
| 6,362,598 B2 | 3/2002 | Laig-Hoerstebrock et al. | |
| 6,399,238 B1 | 6/2002 | Oweis et al. | |
| 6,422,027 B1 | 7/2002 | Coates, Jr. et al. | |
| 6,448,741 B1 | 9/2002 | Inui et al. | |
| 6,462,949 B1 | 10/2002 | Parish, IV et al. | |
| 6,512,347 B1 * | 1/2003 | Hellmann et al. | 320/107 |
| 6,569,556 B2 | 5/2003 | Zhou et al. | |
| 6,662,891 B2 | 12/2003 | Misu et al. | |
| 6,689,510 B1 | 2/2004 | Gow et al. | |
| 6,696,197 B2 | 2/2004 | Inagaki et al. | |
| 6,724,172 B2 | 4/2004 | Koo | |
| 6,750,630 B2 | 6/2004 | Inoue et al. | |
| 6,775,998 B2 | 8/2004 | Yuasa et al. | |
| 6,780,538 B2 | 8/2004 | Hamada et al. | |
| 6,821,671 B2 | 11/2004 | Hinton et al. | |
| 6,826,948 B1 | 12/2004 | Bhatti et al. | |
| 6,878,485 B2 | 4/2005 | Ovshinsky et al. | |
| 6,982,131 B1 | 1/2006 | Hamada et al. | |
| 7,070,874 B2 | 7/2006 | Blanchet et al. | |
| 7,143,724 B2 | 12/2006 | Hashizumi et al. | |
| 7,150,935 B2 | 12/2006 | Hamada et al. | |
| 7,250,741 B2 | 7/2007 | Koo et al. | |
| 7,264,902 B2 | 9/2007 | Horie et al. | |
| 7,278,389 B2 | 10/2007 | Kirakosyan | |
| 7,467,525 B1 | 12/2008 | Ohta et al. | |
| 7,531,270 B2 | 5/2009 | Buck et al. | |
| 7,591,303 B2 * | 9/2009 | Zeigler et al. | 165/271 |
| 7,795,845 B2 | 9/2010 | Cho | |
| 7,797,958 B2 | 9/2010 | Alston et al. | |
| 7,816,029 B2 | 10/2010 | Takamatsu et al. | |
| 7,846,573 B2 | 12/2010 | Kelly | |
| 7,879,480 B2 | 2/2011 | Yoon et al. | |
| 7,883,793 B2 | 2/2011 | Niedzwiecki et al. | |
| 7,976,978 B2 | 7/2011 | Shin et al. | |
| 7,981,538 B2 | 7/2011 | Kim et al. | |
| 7,997,367 B2 | 8/2011 | Nakamura | |
| 8,007,915 B2 | 8/2011 | Kurachi | |
| 8,011,467 B2 * | 9/2011 | Asao et al. | 180/68.5 |
| 8,030,886 B2 | 10/2011 | Mahalingam et al. | |
| 8,067,111 B2 | 11/2011 | Koetting et al. | |
| 8,209,991 B2 | 7/2012 | Kondou et al. | |
| 8,409,743 B2 | 4/2013 | Okada et al. | |
| 8,663,829 B2 | 3/2014 | Koetting et al. | |
| 2002/0086201 A1 | 7/2002 | Payen et al. | |
| 2002/0182493 A1 | 12/2002 | Ovshinsky et al. | |
| 2003/0080714 A1 | 5/2003 | Inoue et al. | |
| 2003/0189104 A1 | 10/2003 | Watanabe et al. | |
| 2003/0211384 A1 | 11/2003 | Hamada et al. | |
| 2004/0069474 A1 | 4/2004 | Wu et al. | |
| 2005/0026014 A1 | 2/2005 | Fogaing et al. | |
| 2005/0089750 A1 | 4/2005 | Ng et al. | |
| 2005/0103486 A1 | 5/2005 | Demuth et al. | |
| 2005/0110460 A1 | 5/2005 | Arai et al. | |
| 2005/0134038 A1 | 6/2005 | Walsh | |
| 2006/0234119 A1 | 10/2006 | Kruger et al. | |
| 2006/0286450 A1 | 12/2006 | Yoon et al. | |
| 2007/0062681 A1 | 3/2007 | Beech | |
| 2007/0087266 A1 | 4/2007 | Bourke et al. | |
| 2007/0227166 A1 | 10/2007 | Rafalovich et al. | |
| 2008/0003491 A1 | 1/2008 | Yahnker et al. | |
| 2008/0041079 A1 | 2/2008 | Nishijima et al. | |
| 2008/0110189 A1 | 5/2008 | Alston et al. | |
| 2008/0182151 A1 | 7/2008 | Mizusaki et al. | |
| 2008/0248338 A1 | 10/2008 | Yano et al. | |
| 2008/0299446 A1 | 12/2008 | Kelly | |
| 2008/0314071 A1 | 12/2008 | Ohta et al. | |
| 2009/0074478 A1 | 3/2009 | Kurachi | |
| 2009/0087727 A1 | 4/2009 | Harada et al. | |
| 2009/0104512 A1 | 4/2009 | Fassnacht et al. | |
| 2009/0123819 A1 | 5/2009 | Kim | |
| 2009/0155680 A1 | 6/2009 | Maguire et al. | |
| 2009/0186265 A1 | 7/2009 | Koetting et al. | |
| 2009/0258288 A1 | 10/2009 | Weber et al. | |
| 2009/0258289 A1 | 10/2009 | Weber et al. | |
| 2009/0280395 A1 | 11/2009 | Nemesh et al. | |
| 2009/0325051 A1 | 12/2009 | Niedzwiecki et al. | |
| 2009/0325052 A1 | 12/2009 | Koetting et al. | |
| 2009/0325054 A1 | 12/2009 | Payne et al. | |
| 2009/0325055 A1 | 12/2009 | Koetting et al. | |
| 2010/0112419 A1 | 5/2010 | Jang et al. | |
| 2010/0203376 A1 | 8/2010 | Choi et al. | |
| 2010/0209760 A1 | 8/2010 | Yoshihara et al. | |
| 2010/0262791 A1 | 10/2010 | Gilton | |
| 2010/0275619 A1 | 11/2010 | Koetting et al. | |
| 2010/0276132 A1 | 11/2010 | Payne | |
| 2010/0279152 A1 | 11/2010 | Payne | |
| 2010/0279154 A1 | 11/2010 | Koetting et al. | |
| 2010/0304203 A1 * | 12/2010 | Buck et al. | 429/120 |
| 2010/0307723 A1 * | 12/2010 | Thomas et al. | 165/104.33 |
| 2011/0000241 A1 * | 1/2011 | Favaretto | 62/244 |
| 2011/0020676 A1 * | 1/2011 | Kurosawa | 429/62 |
| 2011/0027631 A1 * | 2/2011 | Koenigsmann | 429/62 |
| 2011/0027640 A1 | 2/2011 | Gadawski et al. | |
| 2011/0041525 A1 | 2/2011 | Kim et al. | |
| 2011/0045326 A1 | 2/2011 | Leuthner et al. | |
| 2011/0052959 A1 | 3/2011 | Koetting et al. | |
| 2011/0052960 A1 | 3/2011 | Kwon et al. | |
| 2011/0189523 A1 | 8/2011 | Eom | |
| 2011/0293982 A1 | 12/2011 | Martz et al. | |
| 2011/0293983 A1 | 12/2011 | Oury et al. | |
| 2012/0082880 A1 | 4/2012 | Koetting et al. | |
| 2012/0171543 A1 | 7/2012 | Hirsch et al. | |
| 2012/0183830 A1 | 7/2012 | Schaefer et al. | |
| 2013/0045410 A1 | 2/2013 | Yang et al. | |
| 2013/0136136 A1 | 5/2013 | Ando et al. | |
| 2013/0255293 A1 | 10/2013 | Gadawski et al. | |
| 2013/0309542 A1 | 11/2013 | Merriman et al. | |
| 2014/0050953 A1 | 2/2014 | Yoon et al. | |
| 2014/0050966 A1 | 2/2014 | Merriman et al. | |
| 2014/0120390 A1 | 5/2014 | Merriman et al. | |
| 2014/0147709 A1 | 5/2014 | Ketkar et al. | |
| 2014/0227575 A1 | 8/2014 | Ketkar | |
| 2014/0308558 A1 | 10/2014 | Merriman et al. | |
| 2015/0010801 A1 | 1/2015 | Arena et al. | |

(56) References Cited

U.S. PATENT DOCUMENTS

FOREIGN PATENT DOCUMENTS

| | | |
|---|---|---|
| DE | 102009006426 A1 | 7/2010 |
| EP | 1577966 A2 | 9/2005 |
| EP | 1852925 A1 | 11/2007 |
| EP | 2065963 A2 | 6/2009 |
| EP | 2200109 A2 | 6/2010 |
| EP | 2262048 A | 12/2010 |
| GB | 481891 A | 3/1938 |
| JP | 08-111244 A | 4/1996 |
| JP | 09-129213 A | 5/1997 |
| JP | 09-219213 A | 8/1997 |
| JP | 2001-105843 A | 4/2001 |
| JP | 2002-038033 A | 2/2002 |
| JP | 2002-319383 A | 10/2002 |
| JP | 2002333255 A | 11/2002 |
| JP | 2003-188323 A | 7/2003 |
| JP | 2003282112 A | 10/2003 |
| JP | 2004333115 A | 11/2004 |
| JP | 2005-126315 | 5/2005 |
| JP | 2005147443 A | 6/2005 |
| JP | 2005349955 A | 12/2005 |
| JP | 2006-139928 A | 6/2006 |
| JP | 2007305425 A | 11/2007 |
| JP | 2008-054379 A | 3/2008 |
| JP | 2008-062875 A | 3/2008 |
| JP | 2008062875 A | 3/2008 |
| JP | 2008-080995 A | 4/2008 |
| JP | 2008-159440 A | 7/2008 |
| JP | 2009-009889 A | 1/2009 |
| JP | 2009054297 A | 3/2009 |
| KR | 10-2005-0092605 A | 9/2005 |
| KR | 10-0530260 B1 | 11/2005 |
| KR | 10-0637472 B1 | 10/2006 |
| KR | 100637472 B1 | 10/2006 |
| KR | 10-2007-0018507 A | 3/2007 |
| KR | 10-0765659 B1 | 10/2007 |
| KR | 10-2008-0047641 A | 5/2008 |
| KR | 20090082212 A | 7/2009 |
| KR | 10-0921346 B1 | 10/2009 |
| KR | 20090107443 A | 10/2009 |
| KR | 20100119497 A | 9/2010 |
| KR | 20100119498 A | 9/2010 |
| KR | 20100119497 A | 11/2010 |
| KR | 20100119498 A | 11/2010 |
| KR | 20110013269 A | 2/2011 |
| KR | 20110013270 A | 2/2011 |
| KR | 20110013269 A | 9/2011 |
| KR | 20110126764 A | 11/2011 |
| WO | 2006/101343 A1 | 9/2006 |
| WO | 2007/007503 A1 | 1/2007 |
| WO | 2007/115743 A2 | 10/2007 |
| WO | 2008111162 A | 9/2008 |
| WO | 2009/073225 A1 | 6/2009 |
| WO | 2011145830 A2 | 11/2011 |

OTHER PUBLICATIONS

William Koetting et al., pending U.S. Appl. No. 12/897,135 entitled "Battery Cell Assembly, Heat Exchanger, and Method for Manufacturing the Heat Exchanger," filed Oct. 4, 2010.
International Search Report; International Application No. PCT/KR2009/003428, International Filing Date: Jun. 25, 2009; Date of Mailing: Jan. 22, 2010; 2 pages.
International Search Report; International Application No. PCT/KR2009/006121; International Filing Date: Oct. 22, 2009; Date of Mailing: May 3, 2010; 2 pages.
International Search Report; International Application No. PCT/KR2010/005639; International Filing Date: Aug. 24, 2010; Date of Mailing: Jun. 3, 2011; 2 pages.
International Search Report; International Application No. PCT/KR2009/003429; International Filing Date: Jun. 25, 2009; Date of Mailing: Jan. 12, 2010; 3 pages.
International Search Report; International Application No. PCT/KR2009/003436; International Filing Date: Jun. 25, 2009; Date of Mailing: Jan. 22, 2010; 2 pages.
International Search Report; International Application No. PCT/KR2010/002334; International Filing Date: Apr. 15, 2010; Date of Mailing: Nov. 29, 2010; 2 pages.
International Search Report; International Application No. PCT/KR2010/004944; International Filing Date: Jul. 28, 2010; Date of Mailing: Apr. 29, 2011; 2 pages.
International Search Report; International Application No. PCT/KR2009/000258; International Filing Date: Jan. 16, 2009; Date of Mailing: Aug. 28, 2009; 2 pages.
International Search Report; International Application No. PCT/KR2009/003430; International Filing Date: Jun. 25, 2009; Date of Mailing: Feb. 3, 2010; 2 pages.
International Search Report; International Application No. PCT/KR2009/003434; International Filing Date: Jun. 25, 2009; Date of Mailing: Jan. 18, 2010; 2 pages.
International Search Report; International Application No. PCT/KR2010/002336; International Filing Date: Apr. 15, 2010; Date of Mailing: Jan. 31, 2011; 2 pages.
International Search Report; International Application No. PCT/KR2010/002337; International Filing Date: Apr. 15, 2010; Date of Mailing: May 3, 2010; 2 pages.
International Search Report; International Application No. PCT/KR2010/002340; International Filing Date: Apr. 15, 2010; Date of Mailing: Jan. 31, 2011; 2 pages.
Machine Translation of Japanese Patent Application No. 2009-009889 A, published Jan. 15, 2009, 22 pages.
"Gasket". Merriam-Webster. Merriam-Webster. Web. May 30, 2012. <http://www.merriam-webster.com/dictionary/gasket>.
International Search Report for International application No. PCT/KR2013/004015 dated Sep. 26, 2013.
U.S. Appl. No. 14/161,806, filed Jan. 23, 2014 entitled Battery Cell Assembly and Method for Coupling a Cooling Fin to First and Second Cooling Manifolds.
U.S. Appl. No. 14/273,572, filed May 9, 2014 entitled Battery Pack and Method of Assembling the Battery Pack.
U.S. Appl. No. 14/273,586, filed May 9, 2014 entitled Battery Module and Method of Assembling the Battery Module.
U.S. Appl. No. 14/328,000, filed Jul. 10, 2014 entitled Battery System and Method of Assembling the Battery System.
U.S. Appl. No. 14/330,163, filed Jul. 14, 2014 entitled Battery System and Method for Cooling the Battery System.
U.S. Appl. No. 14/511,389, filed Oct. 10, 2014 entitled Battery Cell Assembly.
U.S. Appl. No. 14/516,667, filed Oct. 17, 2014 entitled Battery Cell Assembly.
U.S. Appl. No. 14/531,696, filed Nov. 3, 2014 entitled Battery Pack.
Written Opinion for International application No. PCT/KR2013002597 dated Feb. 2, 2015.

* cited by examiner

BATTERY SYSTEM HAVING AN EVAPORATIVE COOLING MEMBER WITH A PLATE PORTION AND A METHOD FOR COOLING THE BATTERY SYSTEM

BACKGROUND

The inventors herein have recognized a need for an improved battery system and a method for cooling the battery system.

SUMMARY

A battery system in accordance with an exemplary embodiment is provided. The battery system includes an evaporative cooling member having a conduit therein. The battery system further includes a battery module having a housing, a battery cell, and a solid cooling fin. The housing is configured to hold the battery cell therein. The solid cooling fin has first and second panel portions. The first panel portion is disposed against the battery cell. The second panel portion extends through the housing and is disposed on the evaporative cooling member. The solid cooling fin is configured to conduct heat energy from the battery cell to the evaporative cooling member. The evaporative cooling member is configured to receive a gaseous-liquid refrigerant and to transition the gaseous-liquid refrigerant into a gaseous refrigerant utilizing the heat energy received from the solid cooling fin.

A method for cooling a battery system in accordance with another exemplary embodiment is provided. The battery system has a battery module, an evaporative cooling member. The battery module has a housing, a battery cell, and a solid cooling fin. The evaporative cooling member has a conduit therein. The solid cooling fin has first and second panel portions. The first panel portion is disposed against the battery cell. The second panel portion extends through the housing and is disposed on the evaporative cooling member. The method includes receiving a gaseous-liquid refrigerant in the conduit of the evaporative cooling member. The method further includes conducting heat energy from the battery cell to the evaporative cooling member utilizing the solid cooling fin to cool the battery module. The method further includes transitioning the gaseous-liquid refrigerant in the evaporative cooling member into a gaseous refrigerant utilizing the heat energy received by the evaporative cooling member from the solid cooling fin.

DETAILED DESCRIPTION

Figure 1:
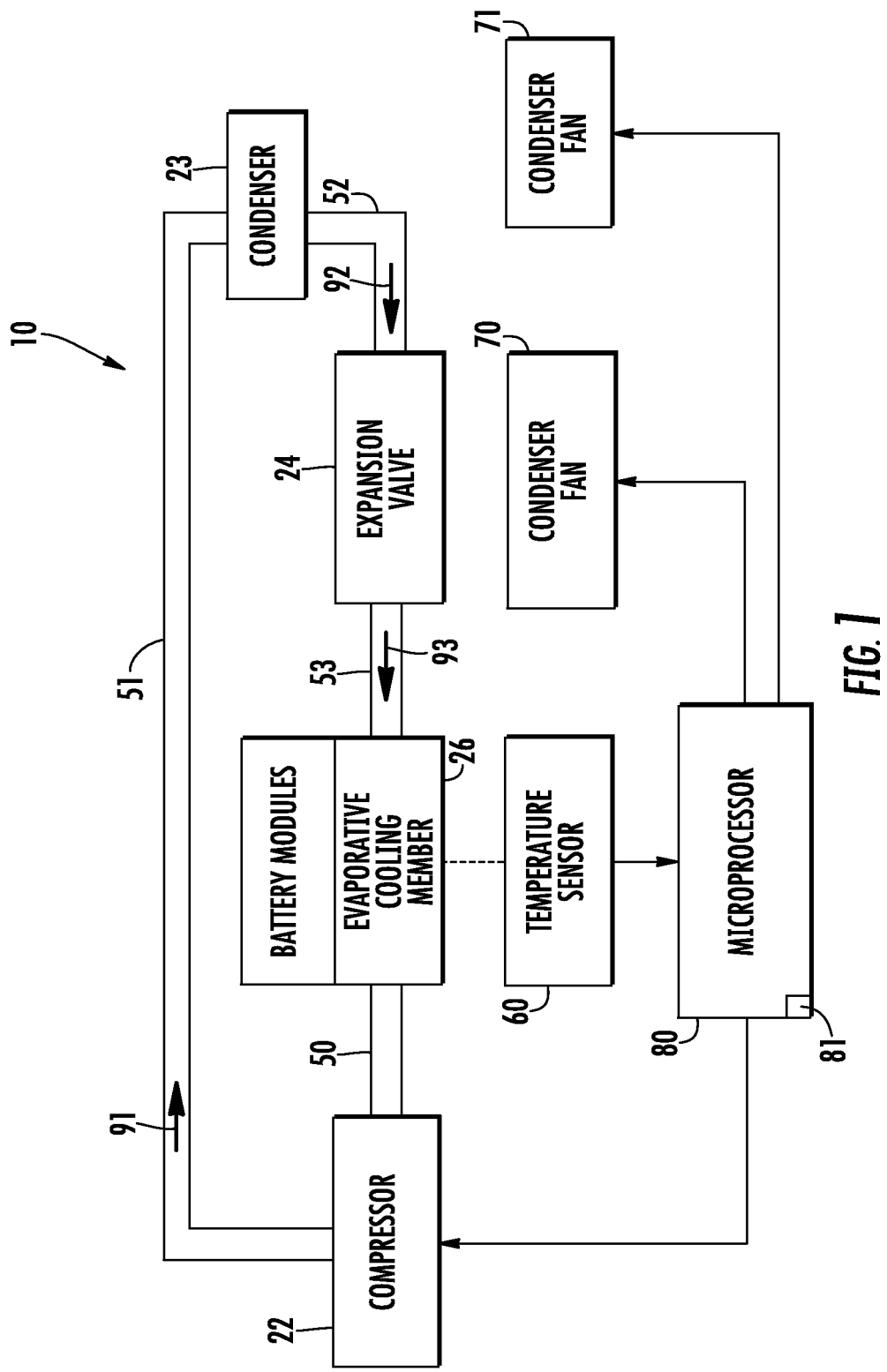
FIG. 1 is a block diagram of a battery system in accordance with an exemplary embodiment.
Figure 2:
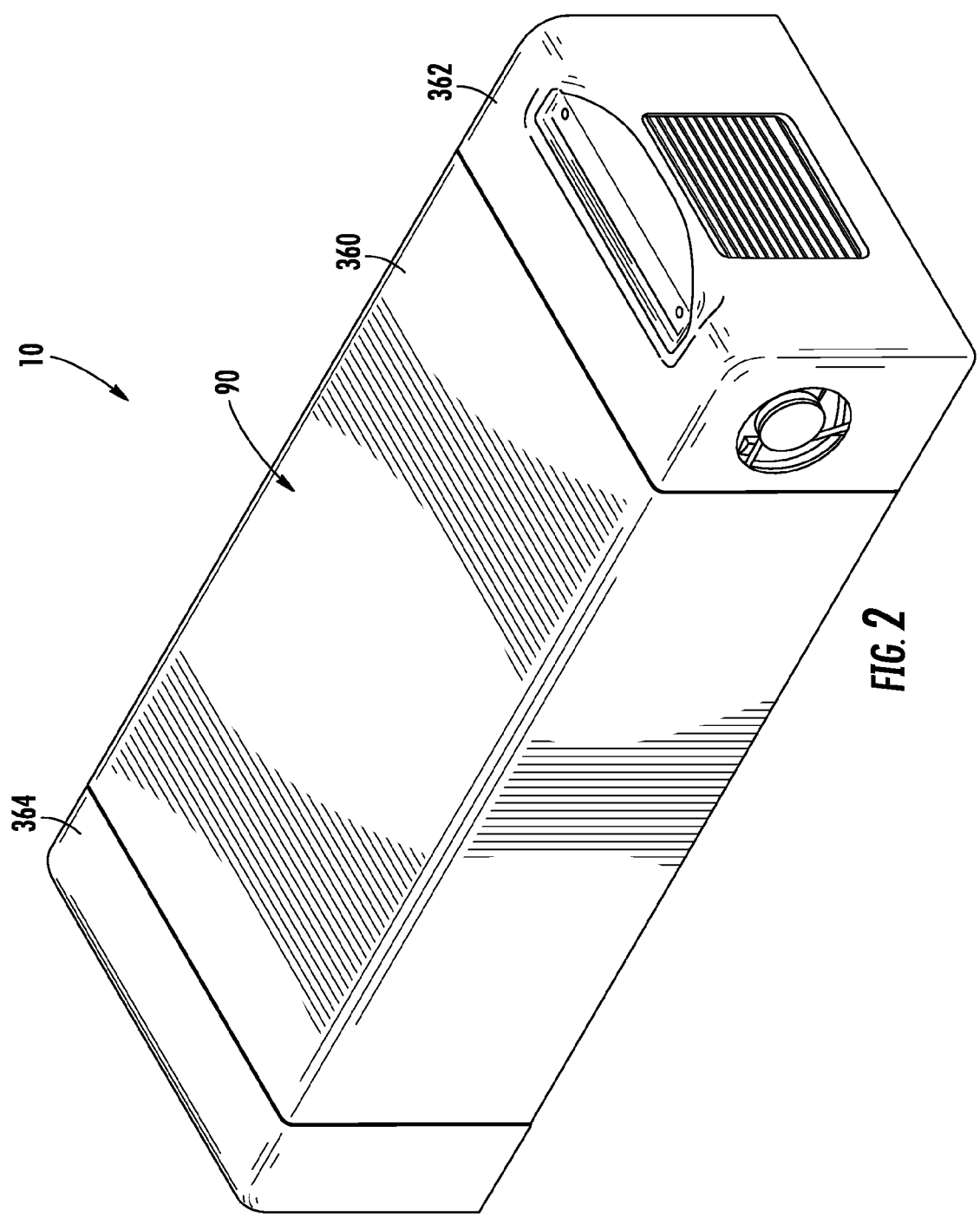
FIG. 2 is a schematic of an external enclosure utilized in the battery system of FIG. 1.
Figure 3:
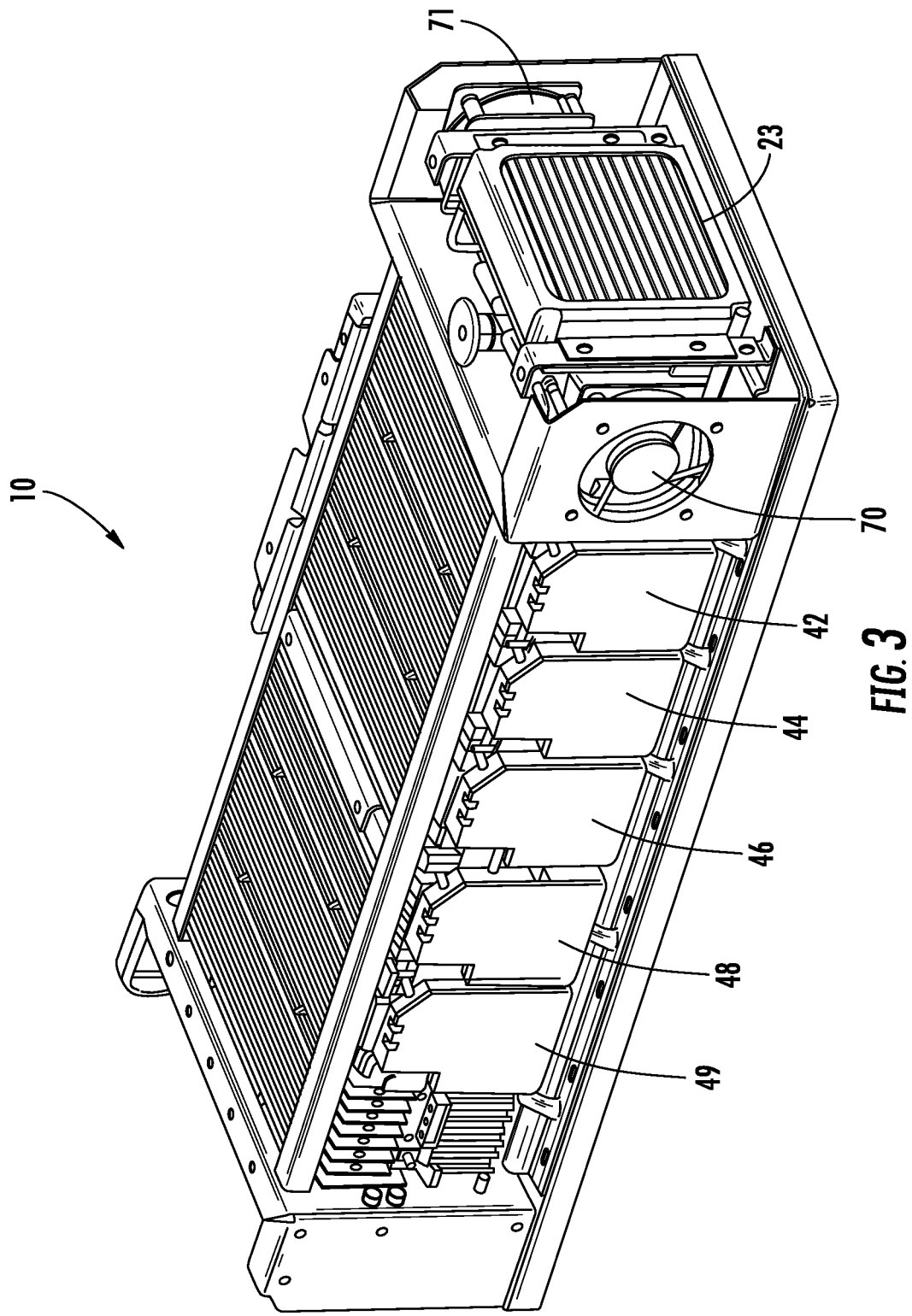
FIG. 3 is schematic of a portion of the battery system of FIG. 1.
Figure 4:
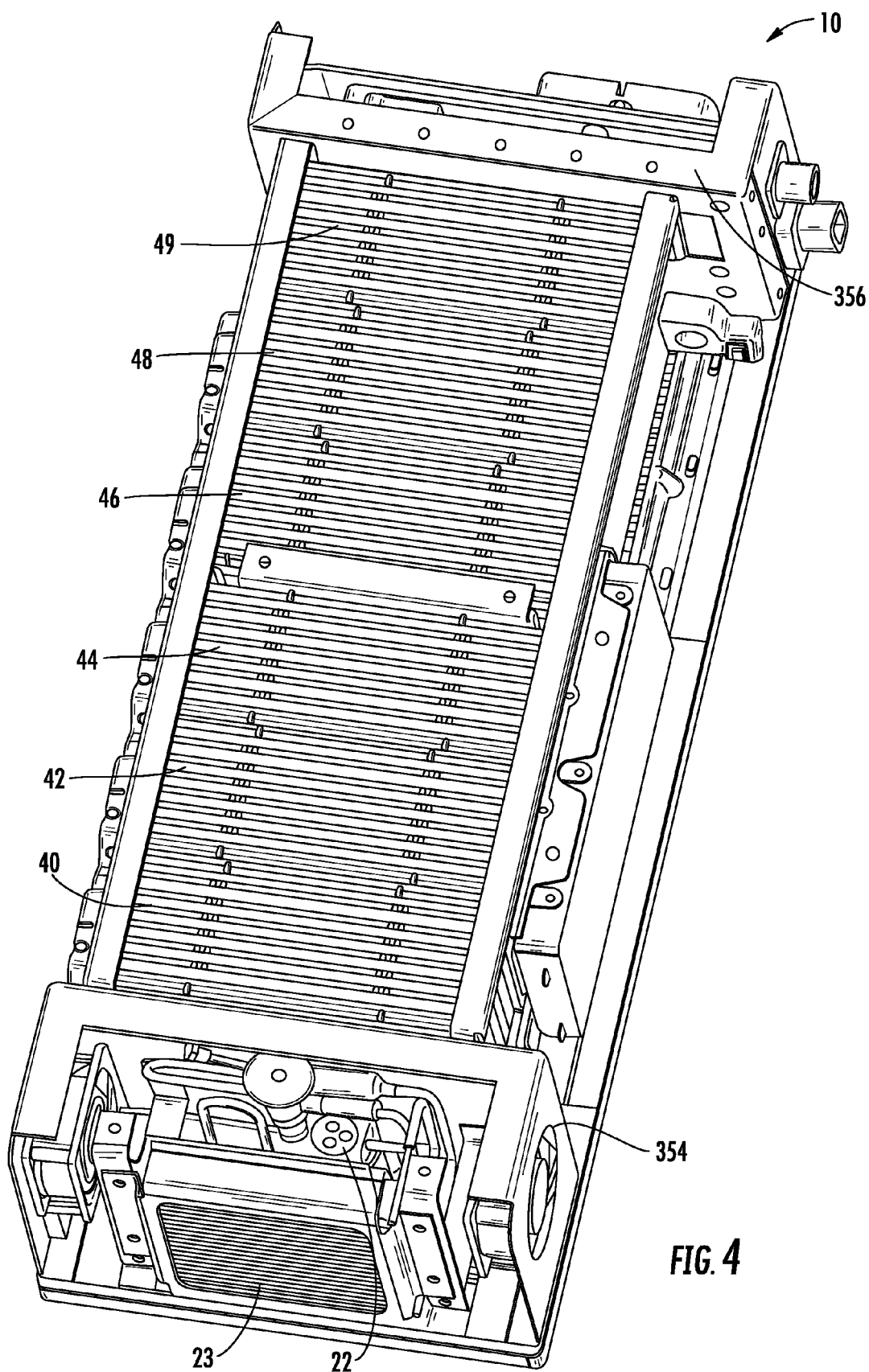
FIG. 4 is an enlarged schematic of a portion of the battery system of FIG. 1.

Referring to FIGS. 1-6, a battery system 10 for generating electrical power in accordance with an exemplary embodiment is illustrated. The battery system 10 includes a compressor 22, a condenser 23, an expansion valve 24, an evaporative cooling member 26, an insulative layer 28, battery modules 40, 42, 44, 46, 48, 49, conduits 50, 51, 52, 53, a temperature sensor 60, condenser fans 70, 71, a microprocessor 80, and an external enclosure 90. An advantage of the battery system 10 is that the system 10 utilizes an evaporative cooling member 26 for cooling the battery modules 40-49 as will be explained in greater detail below.

For purposes of understanding, the term "refrigerant" corresponds to a substance that can reversibly transition between a liquid and a gas in a heat cycle. Exemplary refrigerants include R-11, R-12, R-22, R-134A, R-407C and R-410A. Also, the term "gaseous-liquid refrigerant" corresponds to a refrigerant having a mixture of gas and liquid.

The compressor 22 is configured to pump and compress a gaseous refrigerant 91 through the conduit 51 into the condenser 23 in response to a control signal from the microprocessor 80. As shown, the conduit 51 is fluidly coupled between the compressor 22 and the condenser 23.

The condenser 23 is provided to receive the gaseous refrigerant 91 from the compressor 22 via the conduit 51 and to transition the gaseous refrigerant 91 into a liquid refrigerant 92 by extracting heat energy from the gaseous refrigerant 91. As shown, the conduit 52 is fluidly coupled between the condenser 23 and the expansion valve 24. After exiting the condenser 24, the liquid refrigerant 92 is further pumped through the conduit 52 to the expansion valve 24.

The expansion valve 24 is fluidly coupled between the condenser 23 and the evaporative cooling member 26 via the conduits 52, 53. The expansion valve 24 is configured to receive the liquid refrigerant 92 from the condenser 23 and to decrease a pressure level of the liquid refrigerant 92 to transition the liquid refrigerant 92 into a gaseous-liquid refrigerant 93. The gaseous-liquid refrigerant 93 is routed from the expansion valve 24 to the conduit 110 of the evaporative cooling member 26 via the conduit 53.

Referring to FIGS. 1, 5 and 7-11, the evaporative cooling member 26 is configured to receive the gaseous-liquid refrigerant 93 and to transition the gaseous-liquid refrigerant 93 into the gaseous refrigerant 91 utilizing the heat energy received from solid cooling fins 230-244 in the battery modules 40-49. As a result, the evaporative cooling member 26 cools the battery modules 40-49 via the solid cooling fins 230-244 that conduct heat energy from the battery modules 40-49 to the evaporative cooling member 26. The evaporative cooling member 26 includes a plate portion 100 and a conduit 110. The plate portion 100 has a first side 120 and a second side 122. The plate portion 100 further includes a channel 123 (shown in FIG. 11) that extends from the first side 120 into the plate portion 100. The conduit 110 is disposed in the channel 123 and thermally communicates with the plate portion 100. In one exemplary embodiment, the channel 123 is a serpentine-shaped channel and the conduit 110 is a serpentine-shaped conduit. The conduit 100 is fluidly coupled to the conduit 50 which is further fluidly coupled to the compressor 22. During operation, the gaseous refrigerant 91 from the evaporative cooling member 26 is routed through the conduit 50 to the compressor 22. In one exemplary embodiment, the plate portion 100 is constructed of aluminum and the conduit 110 is constructed of copper. Of course, in alternative embodiments, the plate portion 100 and the conduit 110 could be constructed of other thermally conductive materials known to those skilled in the art. As shown, the evaporative cooling member 26 is disposed on the insulative layer 28. The insulative layer 28 is disposed on a bottom enclosure portion 350 and supports the evaporative cooling member 26 thereon. The insulative layer 28 thermally insulates the evaporative cooling member 26 from the bottom enclosure portion 350.

Figure 5:
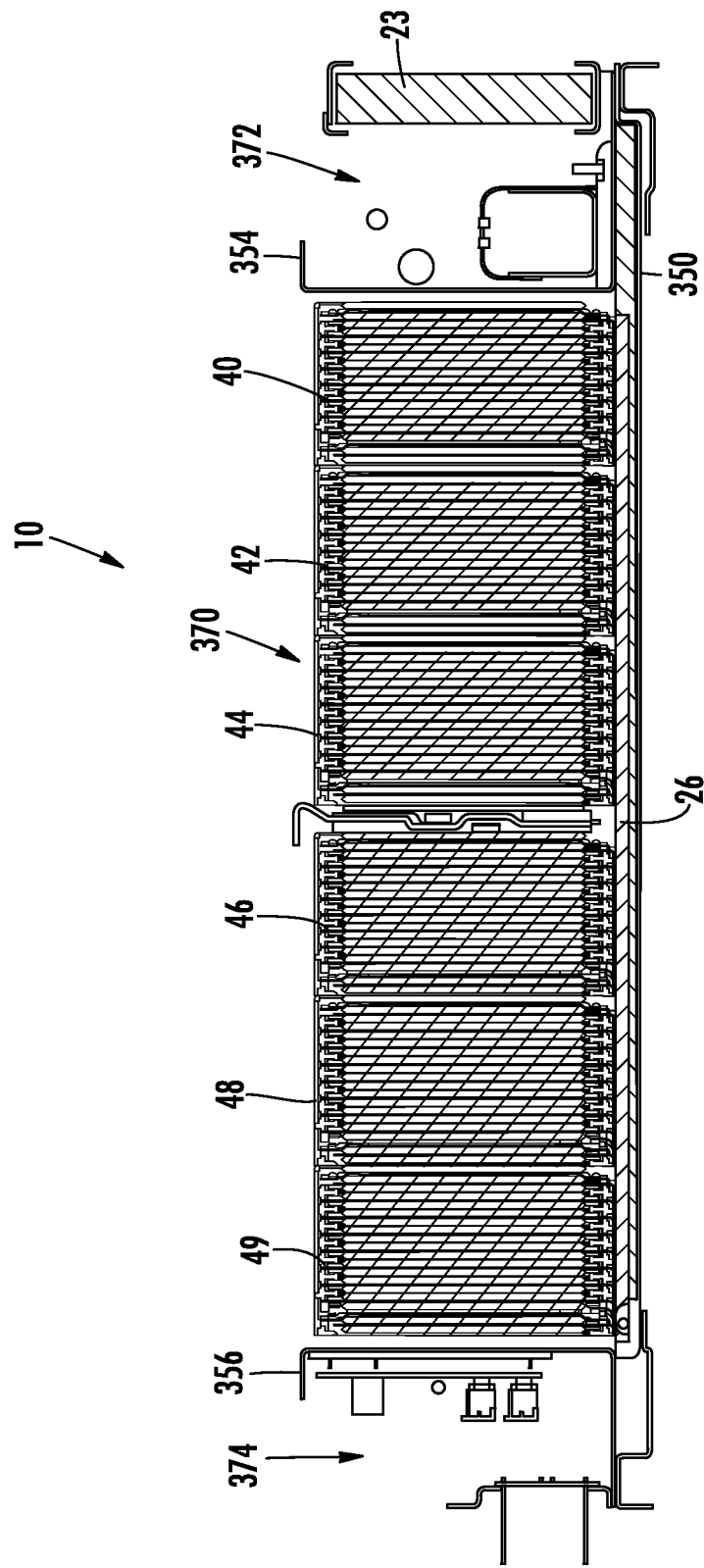
FIG. 5 is a cross-sectional schematic of a portion of the battery system of FIG. 1.
Figure 6:
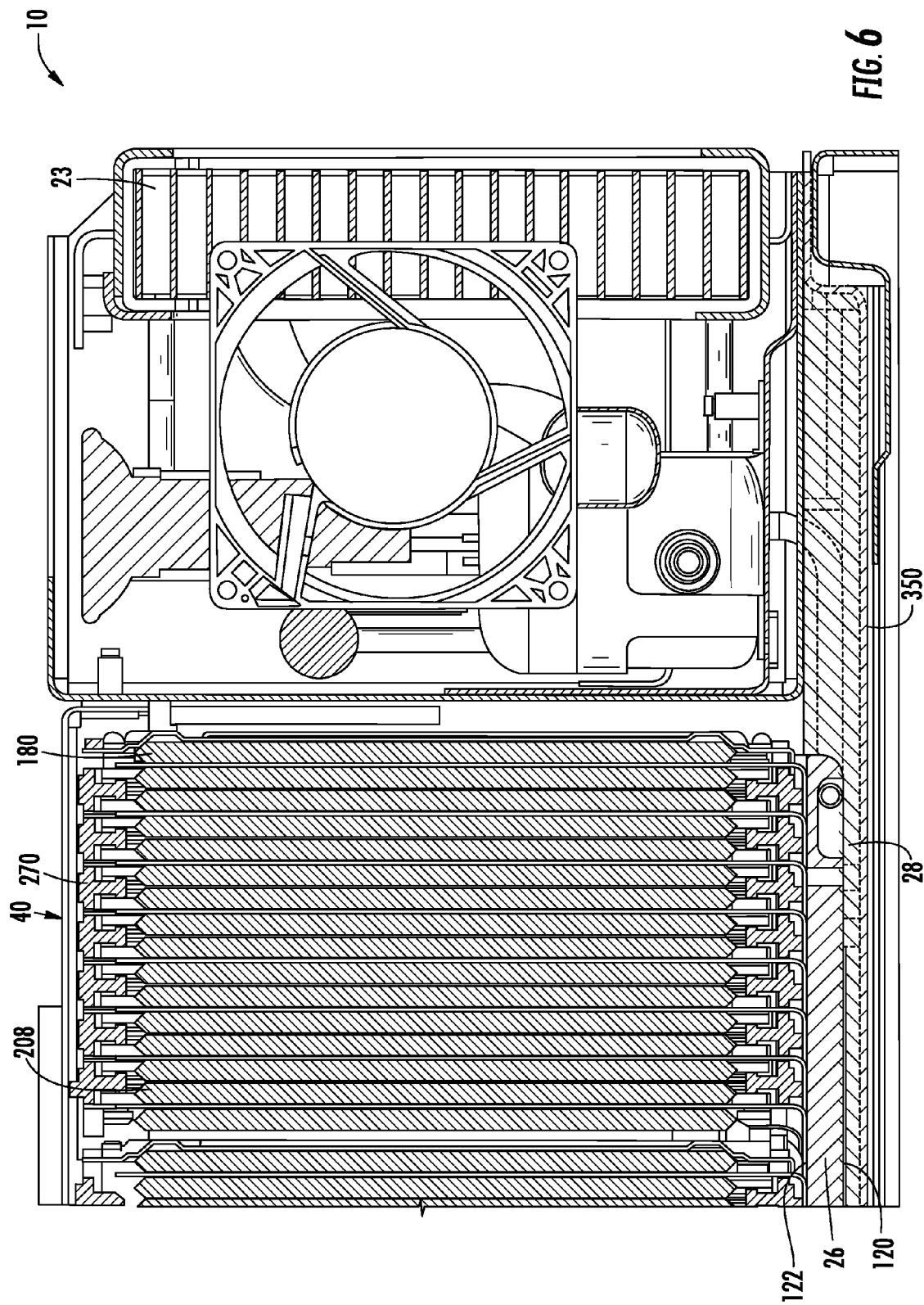
FIG. 6 is an enlarged cross-sectional schematic of a portion of the battery system of FIG. 1.
Figure 7:
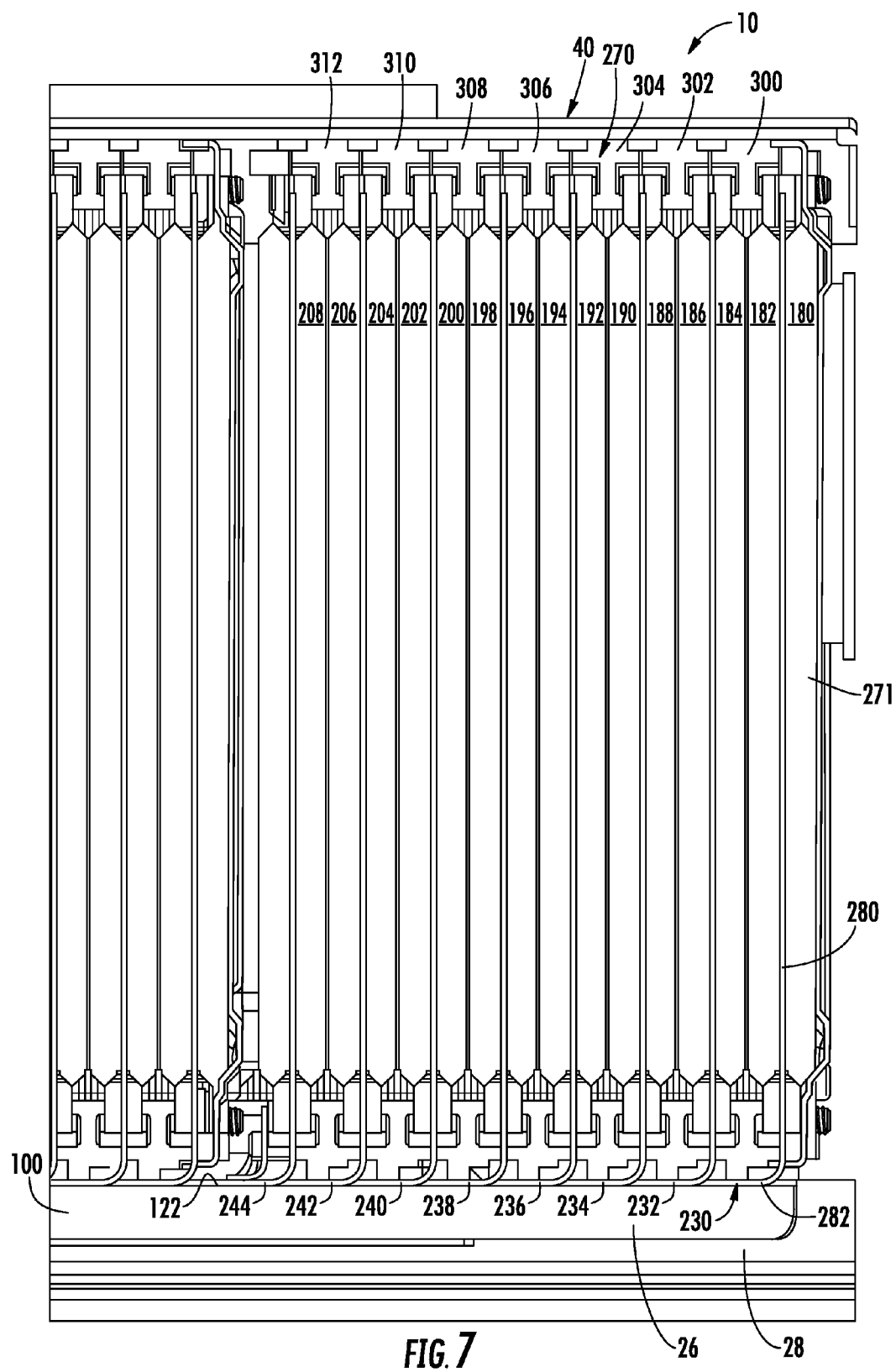
FIG. 7 is another enlarged cross-sectional schematic of a portion of the battery system of FIG. 1.
Figure 8:
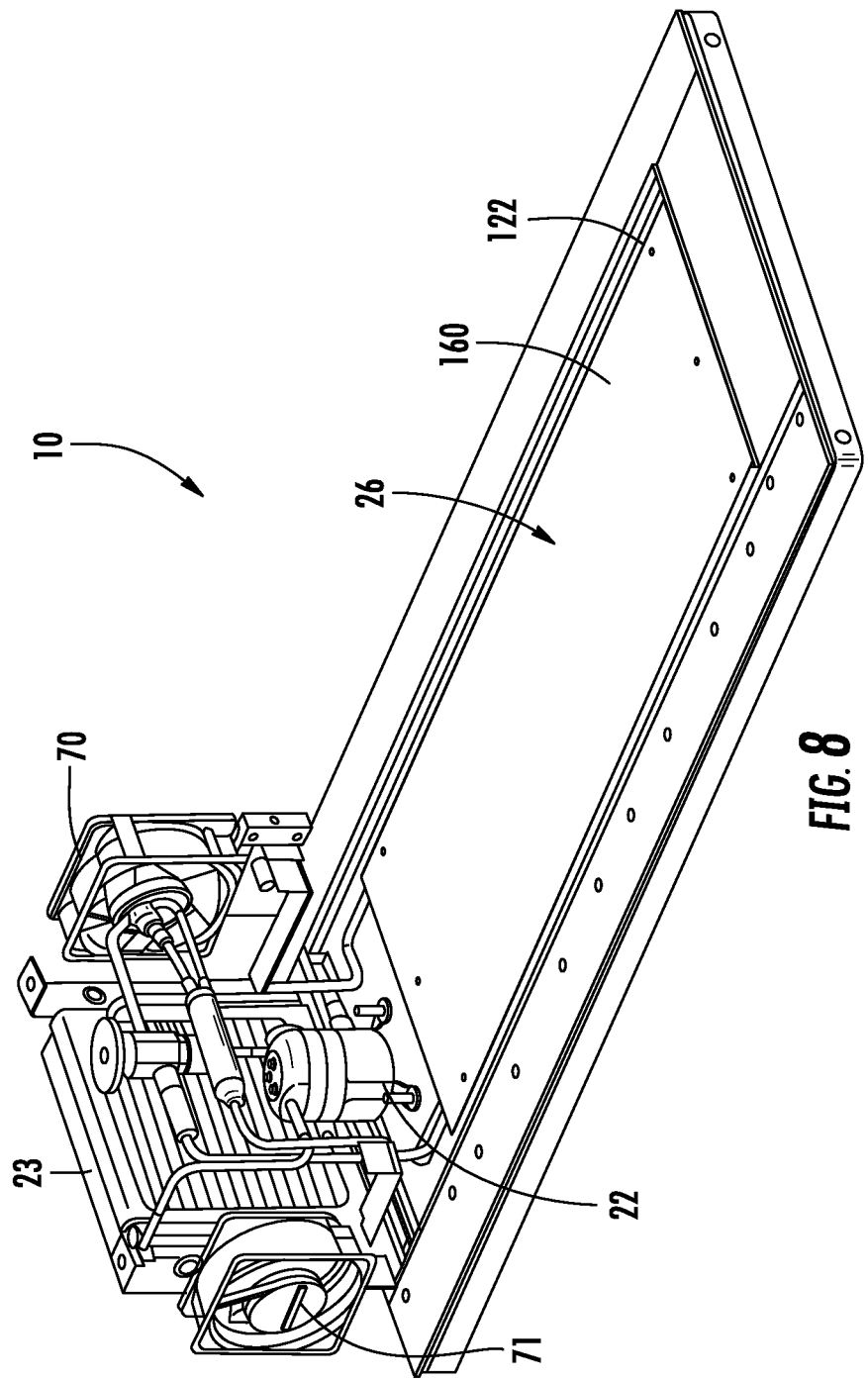
FIG. 8 is a schematic of a portion of the battery system of FIG. 1.
Figure 9:
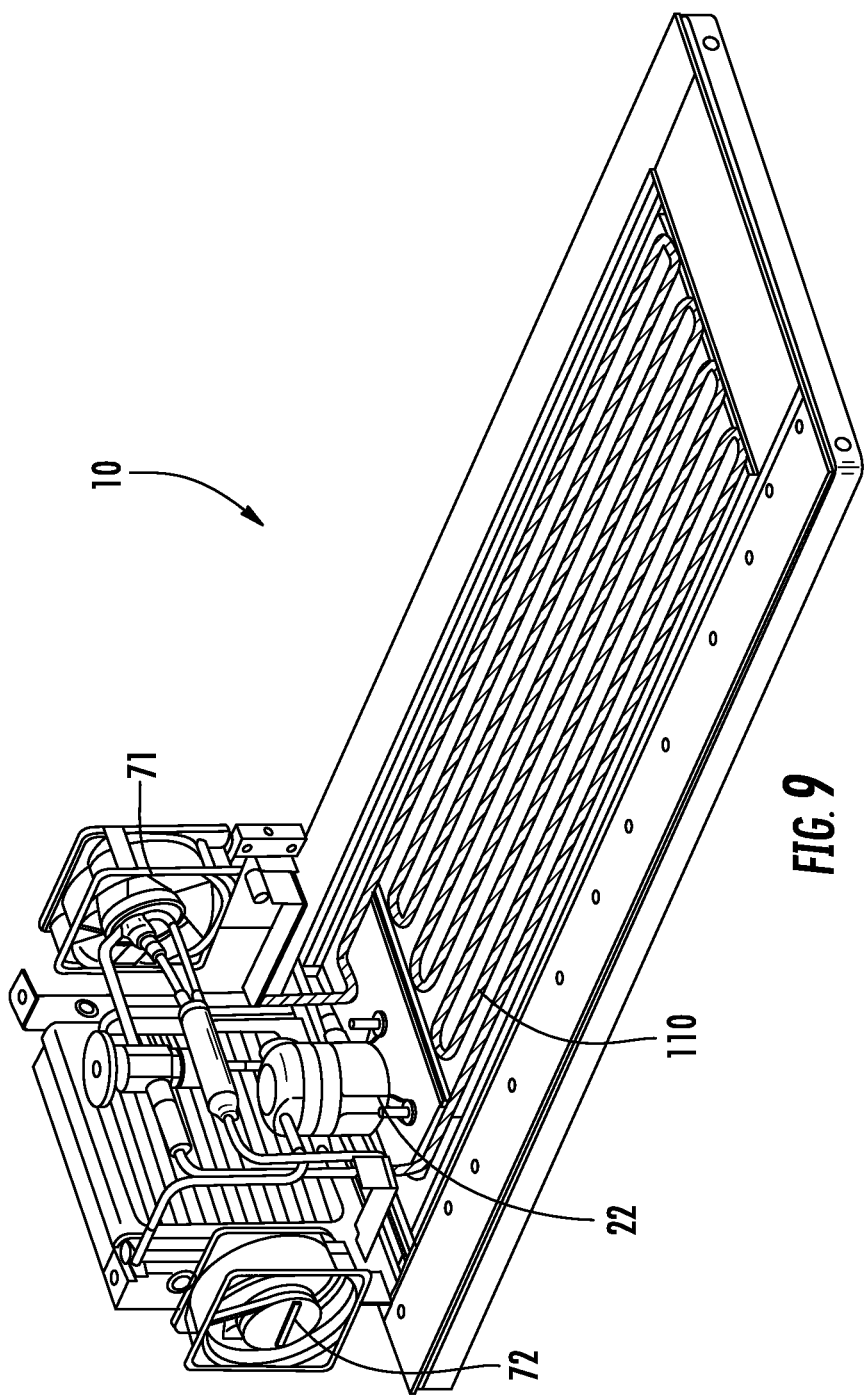
FIG. 9 is another schematic of a portion of the battery system of FIG. 1.
Figure 10:
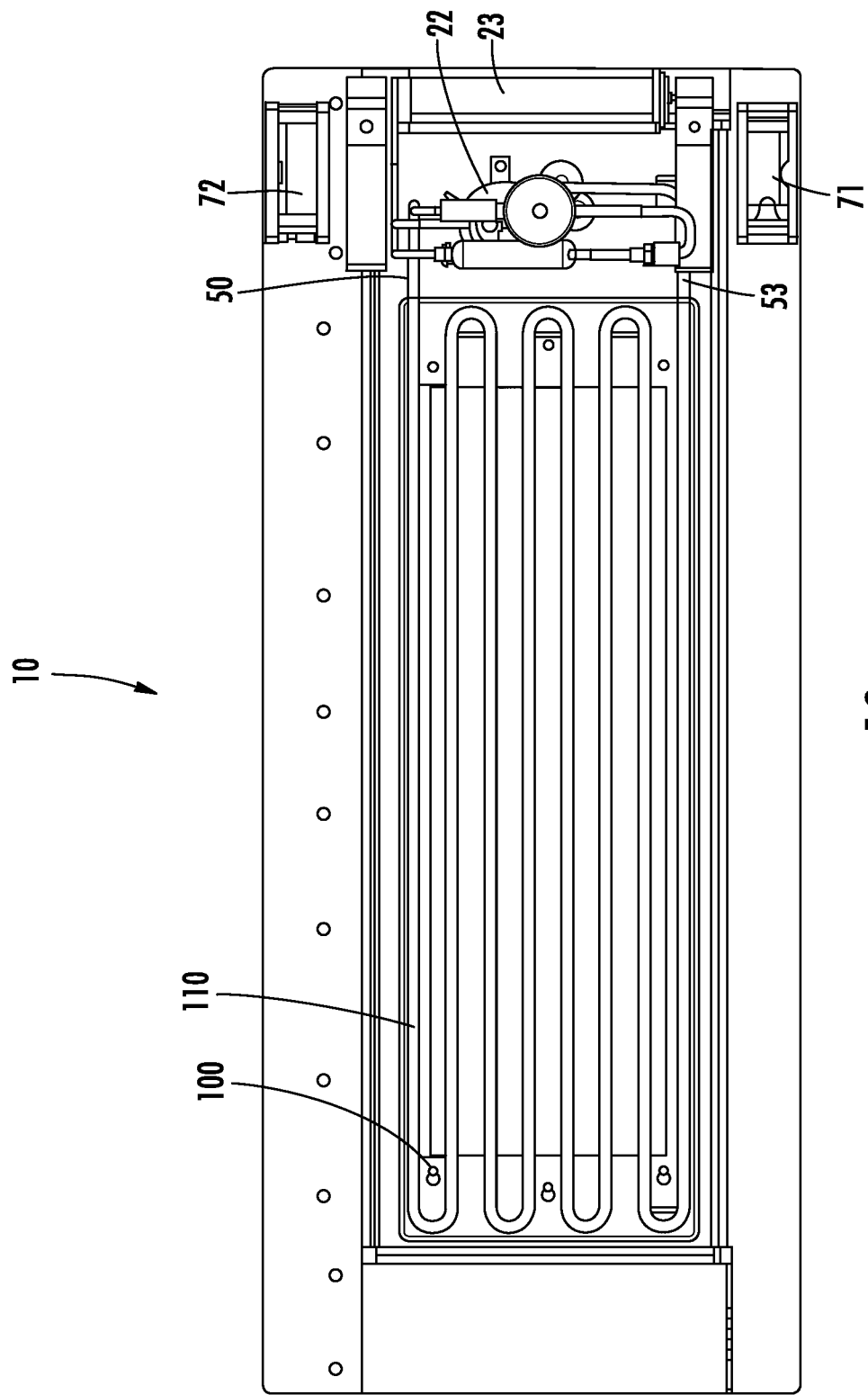
FIG. 10 is another schematic of a portion of the battery system of FIG. 1.
Figure 11:
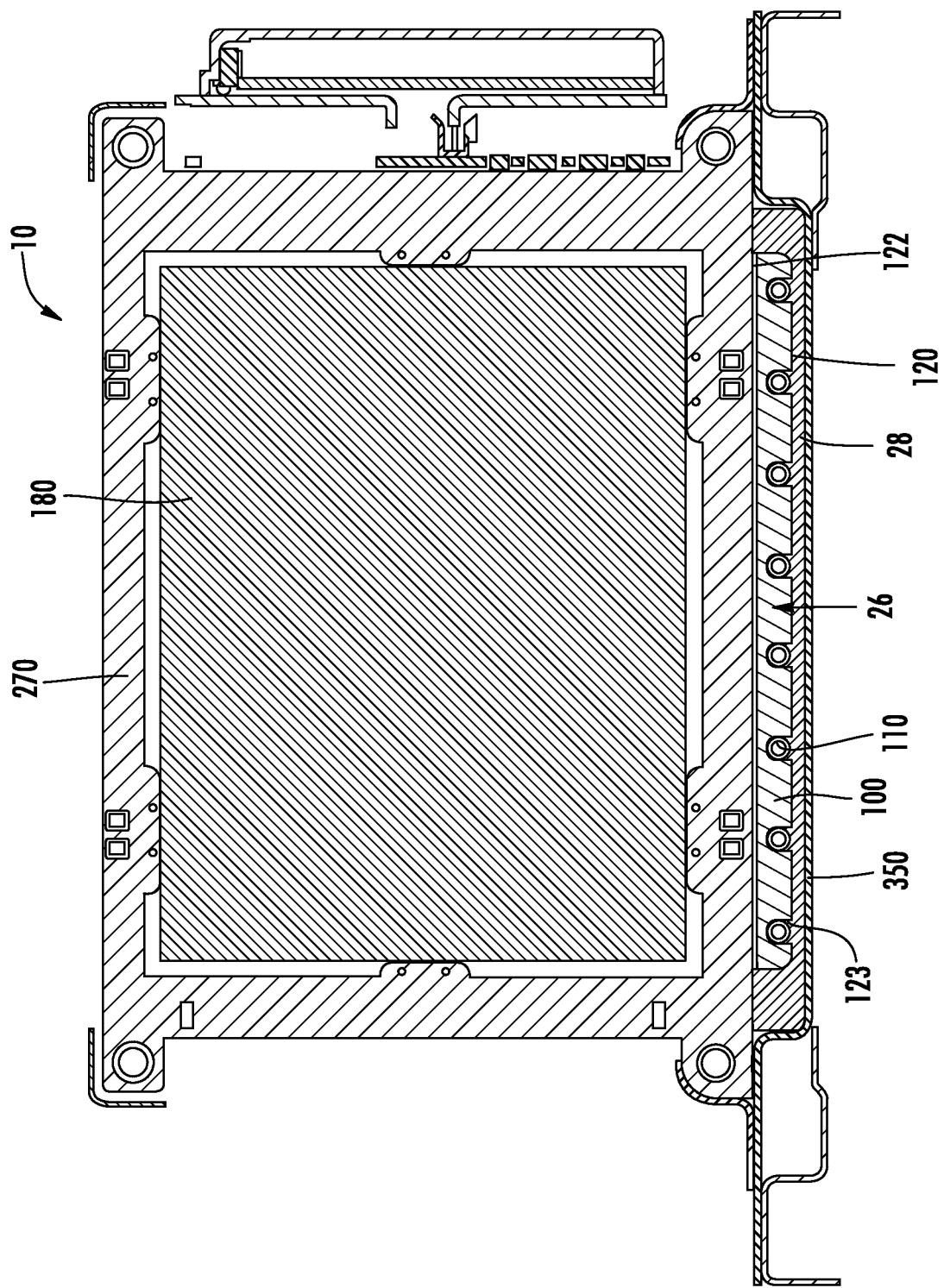
FIG. 11 is a cross-sectional schematic of a portion of the battery system of FIG. 1.
Figure 12:
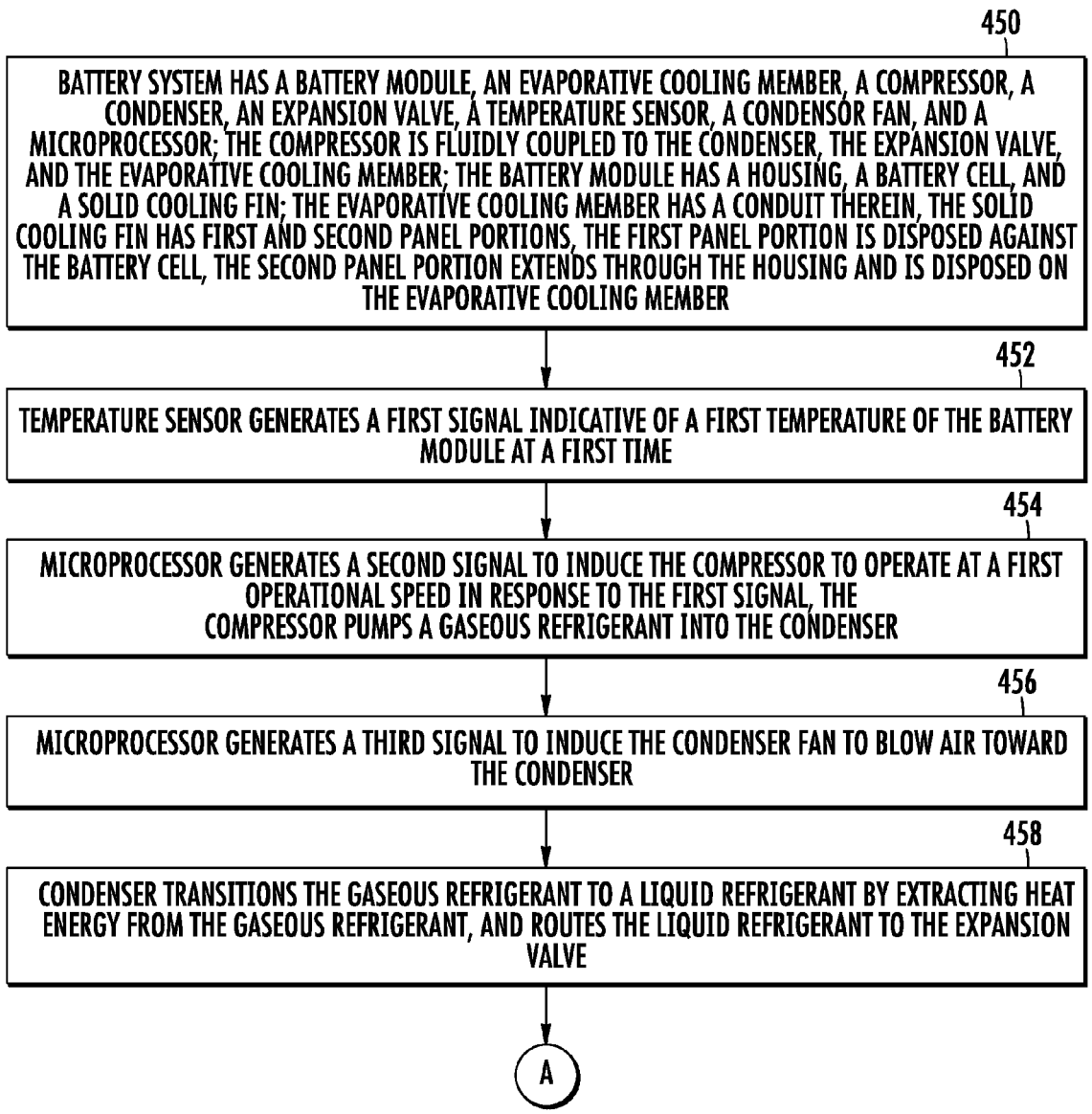
FIGS. 12-14 is a flowchart of a method for cooling the battery system of FIG. 1 in accordance with another exemplary embodiment.
Figure 13:
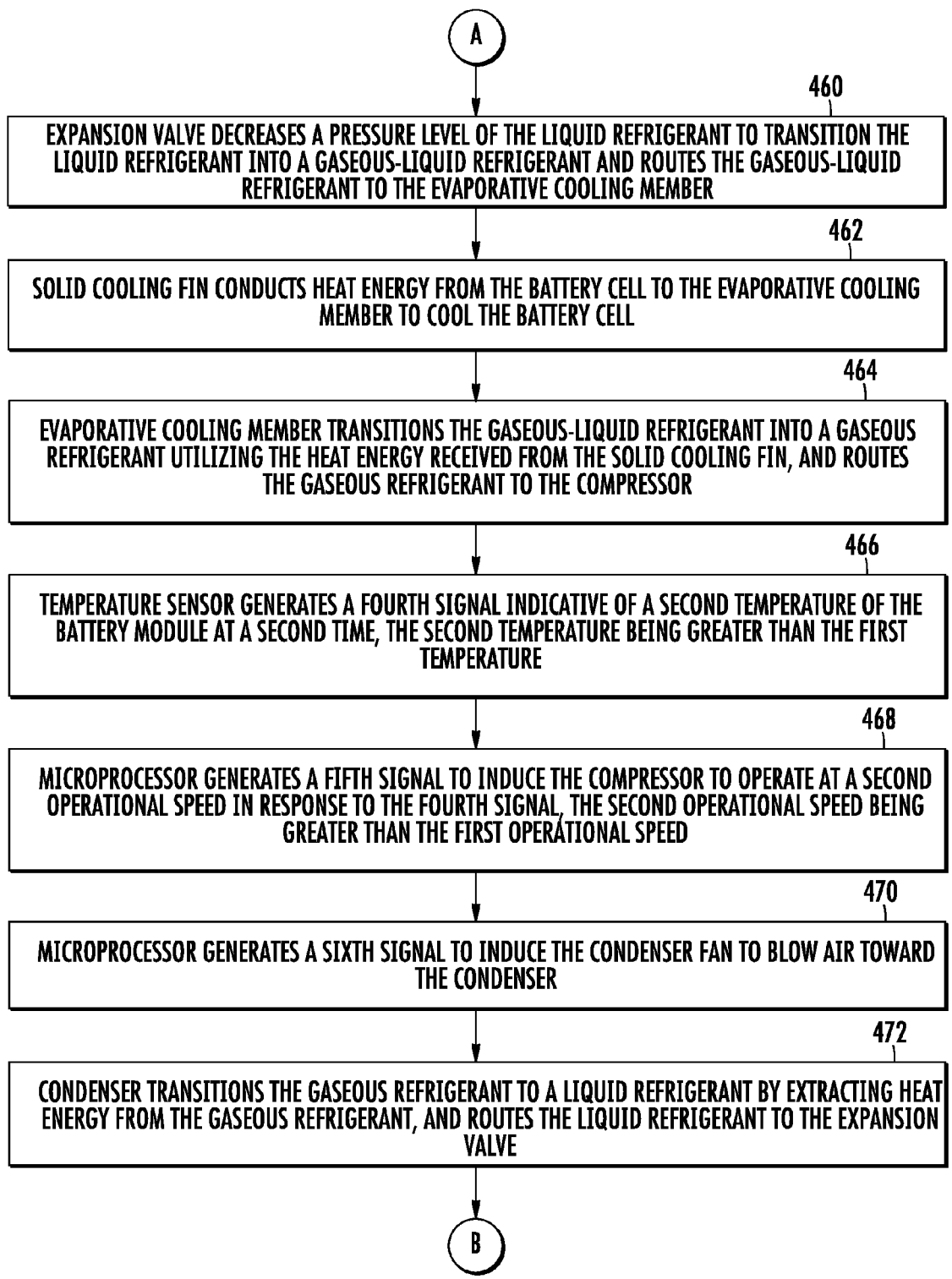
Figure 14:
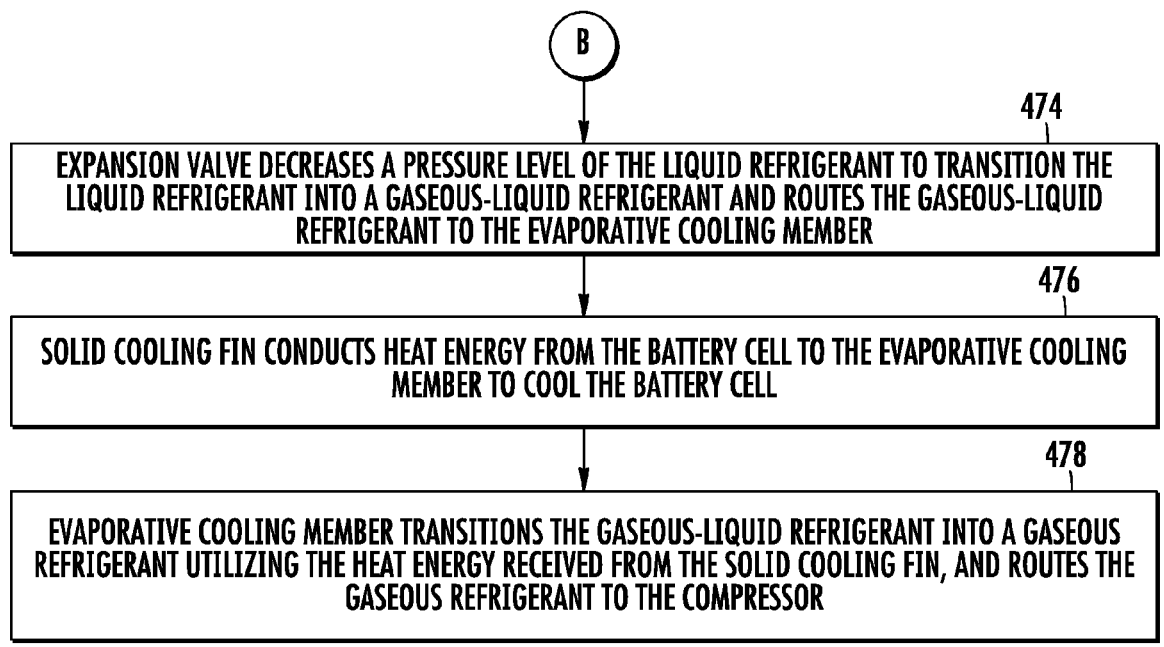

Referring to FIGS. 5-7, the battery modules 40, 42, 44, 46, 48, 49 are provided to generate operational voltages for either an electric vehicle or a hybrid electric vehicle. In one exemplary embodiment, the battery modules 40-49 are electrically coupled in series with one another. The structure each of the battery modules 40-49 is identical to one another. Accordingly, only the structure of the battery module 40 will be discussed in greater detail below for purposes of simplicity. The battery module 40 includes battery cells 180, 182, 184, 186, 188, 190, 192, 196, 198, 200, 202, 204, 206, 208, solid cooling fins 230, 232, 234, 236, 238, 240, 242, 244, and the housing 270.

Since each battery cells 180-208 of battery module 40 have an identical structure, only the structure of the battery cell 180 will be described in further detail. As shown, the battery cell 180 includes a body portion 271 and first and second electrodes (not shown). The body portion 271 is generally rectangular-shaped, and the first and second electrodes extend from a top portion of the body portion 271. In one exemplary embodiment, each battery cell is a lithium-ion battery cell. In alternative embodiments, the battery cells 180-208 could be nickel-cadmium battery cells or nickel metal hydride battery cells for example. Of course, other types of battery cells known to those skilled in the art could be utilized.

The solid cooling fins 230-244 in the battery module 40 are provided to conduct heat energy from the battery cells 180-208 to the evaporative cooling member 26. The structure of each of the solid cooling fins 230-240 is identical to one another. Accordingly, only the structure of the solid cooling fin 230 will be described in greater detail below. The solid cooling fan 230 includes a first panel portion 280 and a second panel portion 282. The first panel portion 280 a substantially rectangular-shaped and is configured to be disposed against adjacent rectangular-shaped surfaces of the battery cells 180, 182. The first panel portion 280 has a sufficient size to cover substantially all of the adjacent rectangular-shaped surface of the battery cell 180, and to cover substantially all of the adjacent rectangular-shaped surface of the battery cell 182. During operation, the first panel portion 280 conducts heat energy from the battery cells 180, 182 to the second panel portion 282. The second panel portion 282 extends from the first panel portion 280 substantially perpendicular to the first panel portion 280. The second panel portion 282 is disposed on the second side 122 of the plate portion 100 of the evaporative cooling member 26. During operation, the second panel portion 282 conducts heat energy from the first panel portion of 280 and the battery cells 180, 182 to the plate portion 100 of the evaporative cooling member 26. In one exemplary embodiment, the solid cooling fins 230-244 are constructed of graphite. Of course, in alternative embodiments, the solid cooling fins 230-244 can be constructed of other thermally conductive materials such as aluminum or copper or a combination thereof for example.

The housing 270 of the battery module 40 is provided to hold the battery cells 180-208 and the first panel portions 280 of the solid cooling fins 230-244 therein. The second panel portions 282 of the solid cooling fins 230-244 extend through the housing 270 and are disposed on the evaporative cooling member 26. The housing 270 is constructed of housing portions 300, 302, 304, 306, 308, 310, 312 that are fixedly coupled together. In one exemplary embodiment, the housing portions 300-312 are constructed of plastic. Of course, other materials known to those skilled in the art could be utilized to construct the housing portions 300-312.

Referring to FIG. 1, the temperature sensor 60 is provided to generate a signal indicative of a temperature level of at least one of the battery modules 40-49 that is received by the microprocessor 80.

The condenser fans 70, 71 are provided to blow air past the condenser 23 to cool the condenser 23 in response to a control signal from the microprocessor 80. As shown, the condenser fans 70, 71 are disposed proximate to the condenser 23.

The microprocessor 80 is provided to control operation of the battery system 10. In particular, the microprocessor 40 is configured to generate control signals for controlling operation of the compressor 22 and the condenser fans 70, 71, in response to a signal from the temperature sensor 60, as will be explained in greater detail below. The microprocessor 80 utilizes a memory device 81 that stores software instructions and associated data for implementing the methods described below.

Referring to FIGS. 1, 2, 4, 5 and 11, the external enclosure 90 is provided to hold the remaining components of the battery system 10 therein. The external enclosure 90 includes a bottom enclosure portion 350, first and second interior walls 354, 356, a first top enclosure portion 360, a second top enclosure portion 362, and a third top enclosure portion 364.

The first top enclosure portion 360 is coupled to the first and second interior walls 354, 356 and to the bottom enclosure portion 350 to define a first airtight enclosed region 370. The battery modules 40, 42, 44, 46, 48, 49 and the temperature sensor 60 are disposed in the first airtight enclosed region 370.

The second top enclosure portion 362 is coupled to the first interior wall 354 and to the bottom enclosure portion 350 to define a second enclosed region 372. The compressor 22, the condenser 23, the expansion valve 24, and the condenser fans 70, 71 are disposed in the second enclosed region.

The third top enclosure portion 364 is coupled to the second interior wall 356 and to the bottom enclosure portion 350 to define a third enclosed region 374. The microprocessor 80 is disposed in the third enclosed region 374.

Referring to FIGS. 1, 10 and 12-14, a flowchart of a method for cooling the battery system 10 in accordance with another exemplary embodiment will be explained. The following method will be described utilizing a single battery module for purposes of simplicity. However, it should be understood that the method could be implemented utilizing a plurality of battery modules.

At step 450, the battery system 10 has the battery module 40, the evaporative cooling member 26, the compressor 22, the condenser 23, the expansion valve 24, the temperature sensor 60, the condenser fan 70, and the microprocessor 80. The compressor 22 is fluidly coupled to the condenser 23, the expansion valve 24, and the evaporative cooling member 26. The battery module 40 has the housing 270, the battery cell 180, and the solid cooling fin 230. The evaporative cooling member 26 has the conduit 110 therein. The solid cooling fin 230 has first and second panel portions 280, 282. The first panel portion 280 is disposed against the battery cell 180. The second panel portion 282 extends through the housing 270 and is disposed on the evaporative cooling member 26. After step 450, the method advances to step 452.

At step 452, the temperature sensor 60 generates a first signal indicative of a first temperature of the battery module 40 at a first time. After step 452, the method advances to step 454.

At step 454, the microprocessor 80 generates a second signal to induce the compressor 22 to operate at a first operational speed in response to the first signal. The compressor 22 pumps the gaseous refrigerant 91 into the condenser 23. After step 454, the method advances to step 456.

At step 456, the microprocessor 80 generates a third signal to induce the condenser fan 70 to blow air toward the condenser 23. After step 456, the method advances to step 458.

At step 458, the condenser 23 transitions the gaseous refrigerant 91 to the liquid refrigerant 92 by extracting heat energy from the gaseous refrigerant 91, and routes the liquid refrigerant 92 to the expansion valve 24. After step 458, the method advances to step 460.

At step 460, the expansion valve 24 decreases a pressure level of the liquid refrigerant 92 to transition the liquid refrigerant 92 into a gaseous-liquid refrigerant 93, and routes the gaseous-liquid refrigerant 93 to the evaporative cooling member 26. After step 460, the method advances to step 462.

At step 462, the solid cooling fin 230 conducts heat energy from the battery cell 180 to the evaporative cooling member 26 to cool the battery cell 180. After step 462, the method advances to step 464.

At step 464, the evaporative cooling member 26 transitions the gaseous-liquid refrigerant 93 into the gaseous refrigerant 91 utilizing the heat energy received from the solid cooling fin 230, and routes the gaseous refrigerant 91 to the compressor 22. After step 464, the method advances to step 466.

At step 466, the temperature sensor 60 generates a fourth signal indicative of a second temperature of the battery module 40 at a second time. The second temperature is greater than the first temperature. After step 466, the method advances to step 468.

At step 468, the microprocessor 80 generates a fifth signal to induce the compressor 22 to operate at a second operational speed in response to the fourth signal. The second operational speed is greater than the first operational speed. After step 468, the method advances to step 470.

At step 470, the microprocessor 80 generates a sixth signal to induce the condenser fan 70 to blow air toward the condenser 23. After step 470, the method advances to step 472.

At step 472, the condenser 23 transitions the gaseous refrigerant 91 to the liquid refrigerant 92 by extracting heat energy from the gaseous refrigerant 91, and routes the liquid refrigerant 92 to the expansion valve 24. After step 472, the method advances to step 474.

At step 474, the expansion valve 24 decreases a pressure level of the liquid refrigerant 92 to transition the liquid refrigerant 92 into the gaseous-liquid refrigerant 93, and routes the gaseous liquid refrigerant 93 to the evaporative cooling member 26. After step 474, the method advances step 476.

At step 476, the solid cooling fin 230 conducts heat energy from the battery cell 180 to the evaporative cooling member 26 to cool the battery cell 180. After step 476, the method advances to step 478.

At step 478, the evaporative cooling member 26 transitions the gaseous-liquid refrigerant 93 into the gaseous refrigerant 91 utilizing the heat energy received from the solid cooling fin 230, and routes the gaseous refrigerant 91 to the compressor 22.

Figure 15:
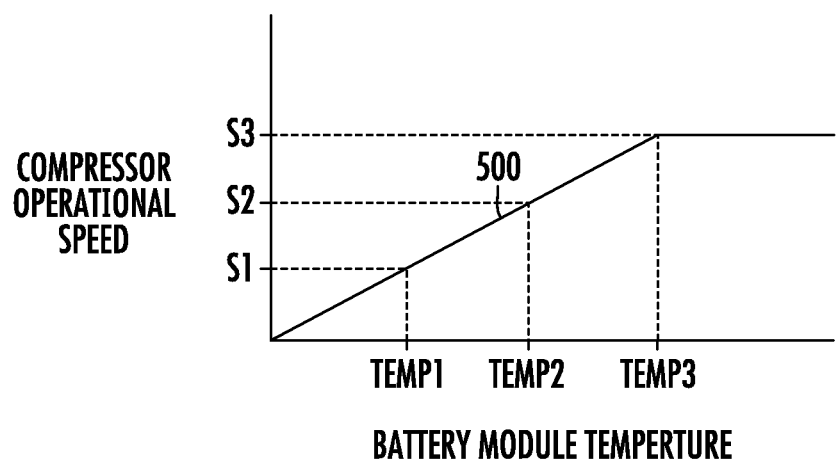
FIG. 15 is a graph of an operational curve associated with a compressor utilized in the battery system of FIG. 1.

Referring to FIG. 15, a graph illustrating an operational curve 500 associated with the compressor 22 (shown in FIG. 1) utilized in the battery system 10 will be explained. When the microprocessor 80 determines that a temperature of the battery module 40 is at a temperature level Temp1, the microprocessor 80 generates a control signal to induce the compressor 22 to operate at an operational speed S1. Further, when the microprocessor 80 determines that a temperature of the battery module 40 is at a temperature level Temp2, which is greater than Temp1, the microprocessor 80 generates a control signal to induce the compressor 22 to operate at an operational speed S2, which is greater than S1. Further, when the microprocessor 80 determines that a temperature of the battery module 40 is at a temperature level Temp3, which is greater than Temp2, the microprocessor 80 generates a control signal to induce the compressor 22 to operate at an operational speed S3, which is greater than S2.

The battery system 10 and the method for cooling the battery system 10 provide a substantial advantage over other battery systems and methods. In particular, the battery system 10 utilizes an evaporative cooling member 26 to effectively cool the battery modules 40-49 in the battery system 10.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A battery system, comprising:
    an external enclosure having a bottom enclosure portion, the bottom enclosure portion having a peripheral portion and a first recessed portion, the peripheral portion being disposed around and coupled to an upper end of the first recessed portion, the peripheral portion extending outwardly from the first recessed portion, the recessed portion defining a first recessed region therein;
    an insulative layer disposed in the first recessed region of the bottom enclosure portion, the insulative layer defining a second recessed region therein;
    an evaporative cooling member disposed in the second recessed region of the insulative layer and in direct abutting contact with the insulative layer, the evaporative cooling member having a rectangular-shaped plate portion and a serpentine-shaped conduit therein, the rectangular-shaped plate portion further having a serpentine-shaped channel therein, the serpentine-shaped conduit being disposed in the serpentine-shaped channel and thermally communicating with the rectangular-shaped plate portion;
    a battery module having a housing, a battery cell, and a solid cooling fin; the housing configured to hold the battery cell therein, the solid cooling fin having first and second panel portions, the first panel portion being disposed in direct abutting contact with the battery cell, the second panel portion extending through the housing and being disposed on the second side of the rectangular-shaped plate portion of the evaporative cooling member, the solid cooling fin configured to conduct heat energy from the battery cell to the evaporative cooling member; the housing of the battery module being disposed in direct abutting contact with a portion of the insulative layer and the peripheral portion of the bottom enclosure portion;

the evaporative cooling member configured to receive a gaseous-liquid refrigerant in the serpentine shaped conduit and to transition the gaseous-liquid refrigerant into a gaseous refrigerant utilizing the heat energy received from the solid cooling fin;

the external enclosure defining a first enclosed region that holds the evaporative cooling member and the battery module therein.

2. The battery system of claim 1, wherein the serpentine-shaped channel extends from the first side into the rectangular-shaped plate portion and communicates with the insulative layer, the first side of the evaporative cooling member contacting the insulative layer.

3. The battery system of claim 2, wherein the rectangular-shaped plate portion is constructed of aluminum and the serpentine-shaped conduit is constructed of copper.

4. The battery system of claim 1, further having first and second interior walls coupled to the bottom enclosure portion; and first and second top enclosure portions;

the first top enclosure portion being coupled to the first and second interior walls and to the bottom enclosure portion to define the first enclosed region.

5. The battery system of claim 4, wherein the first enclosed region is an airtight enclosed region.

6. The battery system of claim 4, wherein the second top enclosure portion is coupled to the first interior wall and to the bottom enclosure portion to define a second enclosed region for holding a compressor and a condenser therein.

7. The battery system of claim 1, further comprising:

a compressor fluidly coupled to the evaporative cooling member, the compressor configured to pump the gaseous refrigerant into a condenser; and the condenser fluidly coupled to the compressor and to the evaporative cooling member, the condenser configured to receive the gaseous refrigerant from the compressor, the condenser further configured transition the gaseous refrigerant to the liquid refrigerant by extracting heat energy from the gaseous refrigerant.

8. The battery system of claim 7, further comprising an expansion valve fluidly coupled between the condenser and the evaporative cooling member, the expansion valve receiving the liquid refrigerant from the condenser and decreasing a pressure level of the liquid refrigerant to transition the liquid refrigerant into the gaseous-liquid refrigerant, the gaseous-liquid refrigerant being routed from the expansion valve to the evaporative cooling member.

9. The battery system of claim 7, further comprising:

a temperature sensor configured to generate a first signal indicative of a first temperature of the battery module at a first time;

a microprocessor operably coupled to the temperature sensor, the microprocessor configured to generate a second signal to induce the compressor to operate at a first operational speed in response to the first signal;

the temperature sensor further configured to generate a third signal indicative of a second temperature of the battery module at a second time, the second temperature being greater than the first temperature; and the microprocessor further configured to generate a fourth signal to induce the compressor to operate at a second operational speed in response to the second signal, the second operational speed being greater than the first operational speed.

10. The battery system of claim 9, wherein the temperature sensor being disposed in the first enclosed region of the external enclosure, and the microprocessor being disposed in a second enclosed region defined by the external enclosure.

11. The battery system of claim 1, wherein the second panel portion is coupled to an end of the first panel portion and extends substantially perpendicular to the first panel portion, the second panel portion extending vertically past an entire bottom side of the housing of the battery module.

12. The battery system of claim 1, wherein a width of the housing of the battery module is greater than a width of the insulative layer.

13. The battery system of claim 1, wherein a gap is formed between a top surface of the peripheral portion of the bottom enclosure portion and the second side of the rectangular-shaped plate portion of the evaporative cooling member for receiving the second panel portion of the solid cooling fin therein.

14. The battery system of claim 13, wherein the gap has a vertical length equal to a vertical thickness of the second panel portion of the solid cooling fin.

15. A method for cooling a battery system, the method comprising:

providing the battery system having an external enclosure, an insulative layer, a battery module, and an evaporative cooling member, external enclosure having a bottom enclosure portion, the bottom enclosure portion having a peripheral portion and a first recessed portion, the peripheral portion being disposed around and coupled to an upper end of the first recessed portion, the peripheral portion extending outwardly from the first recessed portion, the recessed portion defining a first recessed region therein; the insulative layer defining a second recessed region therein, the evaporative cooling member having a plate portion and a serpentine-shaped conduit therein, the plate portion having a first side and a second side, the plate portion further having a serpentine-shaped channel therein, the serpentine-shaped conduit being disposed in the serpentine-shaped channel and thermally communicating with the plate portion; the battery module having a housing, a battery cell, and a solid cooling fin; the housing configured to hold the battery cell therein, the solid cooling fin having first and second panel portions, the first panel portion being disposed disposed in direct abutting contact with the battery cell, the second panel portion extending through the housing and being disposed on the second side of the plate portion of the evaporative cooling member; the external enclosure defining a first enclosed region;

disposing the insulative layer in direct abutting contact with the bottom enclosure portion in the first recessed region of the bottom enclosure portion; the insulative layer being further disposed in the first enclosed region of the external enclosure;

disposing the evaporative cooling member in direct abutting contact with the insulative layer in the second recessed region of the insulative layer, the evaporative cooling member being further disposed in the first enclosed region of the external enclosure;

disposing the battery module in direct abutting contact with the plate portion of the evaporative cooling member, a portion of the insulative layer, and the peripheral portion of the bottom enclosure portion; the battery module being further disposed in the first enclosed region of the external enclosure;

receiving a gaseous-liquid refrigerant in the conduit disposed in the channel of the plate portion of the evaporative cooling member;

conducting heat energy from the battery cell to the evaporative cooling member utilizing the solid cooling fin to cool the battery module; and transitioning the gaseous-liquid refrigerant in the evaporative cooling member into a gaseous refrigerant utilizing the heat energy received by the evaporative cooling member from the solid cooling fin.

16. The method of claim 15, wherein the battery system further includes a compressor fluidly coupled to the evaporative cooling member, a condenser fluidly coupled to the compressor and to the evaporative cooling member, a microprocessor, and a temperature sensor, the method further comprising:

generating a first signal indicative of a first temperature of the battery module at a first time utilizing the temperature sensor;

generating a second signal to induce the compressor to operate at a first operational speed utilizing a microprocessor in response to the first signal;

generating a third signal indicative of a second temperature of the battery module at a second time utilizing the temperature sensor, the second temperature being greater than the first temperature; and generating a fourth signal to induce the compressor to operate at a second operational speed utilizing the microprocessor in response to the second signal, the second operational speed being greater than the first operational speed.

17. The method of claim 16, further comprising:

disposing the temperature sensor in the first enclosed region of the external enclosure;

disposing the compressor in a second enclosed region defined by the external enclosure; and disposing the microprocessor in a third enclosed region defined by the external enclosure.

18. The method of claim 15, further comprising:

coupling a first bracket to both the housing of the battery module and the peripheral portion of the bottom enclosure portion; and coupling a second bracket to both the housing of the battery module and the peripheral portion of the bottom enclosure portion.

* * * * *